United States Patent [19]

Costello et al.

[11] 4,149,033
[45] Apr. 10, 1979

[54] ACOUSTIC COUPLER ASSEMBLY

[75] Inventors: Matthew J. Costello, Bethel; Albert M. De Luca, New Fairfield; Thomas K. Saunders, New Milford; James F. McGuire, Danbury, all of Conn.

[73] Assignee: Graphic Sciences, Inc., Danbury, Conn.

[21] Appl. No.: 851,506

[22] Filed: Nov. 14, 1977

[51] Int. Cl.² ............................................. H04M 11/00
[52] U.S. Cl. ..................................................... 179/1 C
[58] Field of Search .................... 179/1 C, 2 C, 146 R

[56] References Cited
U.S. PATENT DOCUMENTS

| 2,154,705 | 4/1939 | Schultz | 179/146 R |
| 3,592,966 | 7/1971 | Hansen | 179/1 C |

Primary Examiner—Kathleen H. Claffy
Assistant Examiner—Kenneth A. Chayt
Attorney, Agent, or Firm—Kevin R. Peterson; Robert A. Green; Edward J. Feeney, Jr.

[57] ABSTRACT

The disclosure is of facsimile apparatus having support means for holding a telephone handset during operation of the machine in receiving or transmitting a message. This means comprises a seat of rubber on which the handset rests, and, in addition, a ring of smooth material on which the handset slides as it is brought into engagement with the support means and as it is slipped into its operating position with respect to the support means. The apparatus also includes a novel, spring support arrangement for the handset support.

8 Claims, 13 Drawing Figures

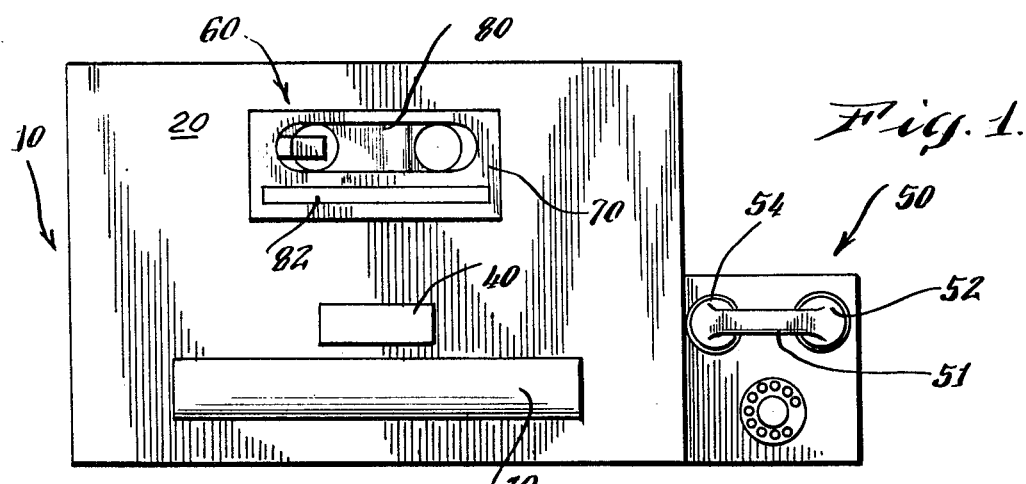
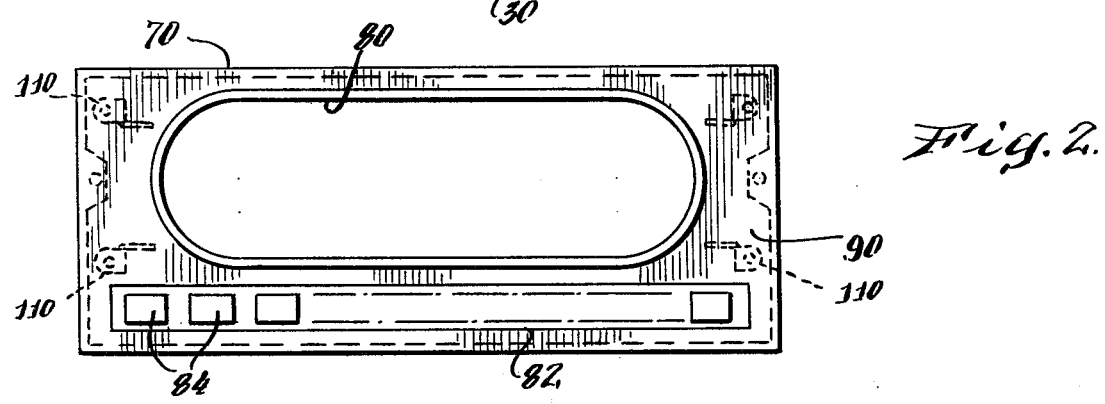
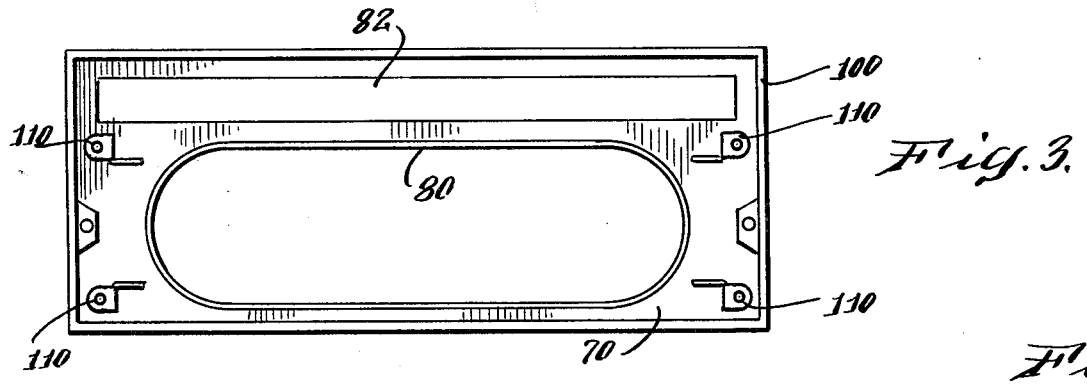
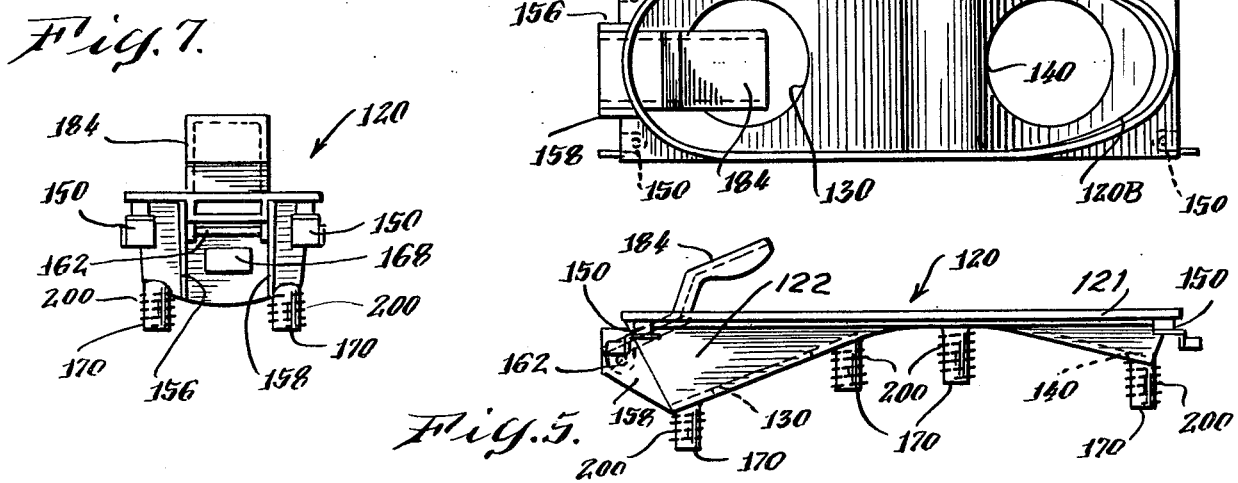

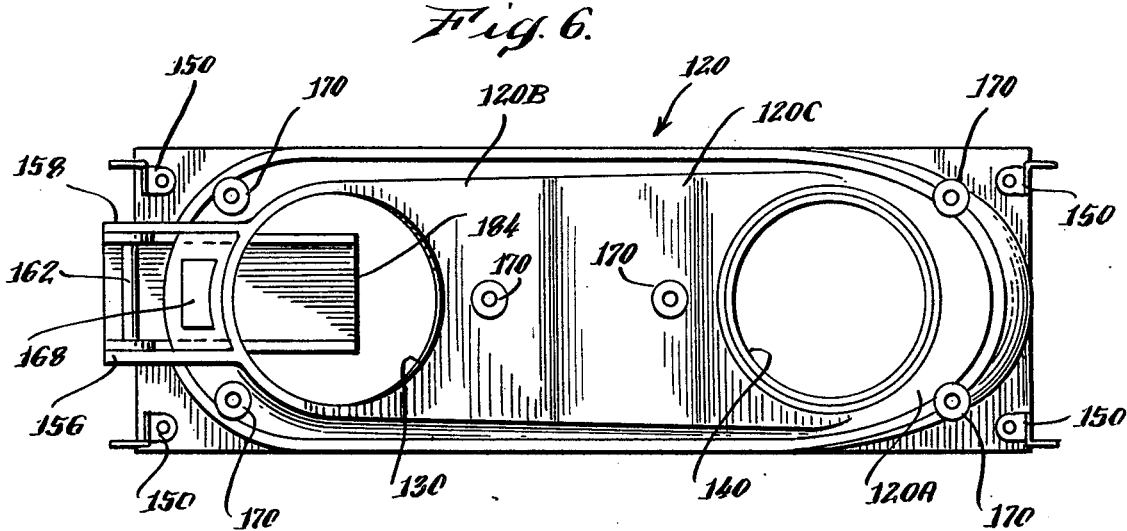
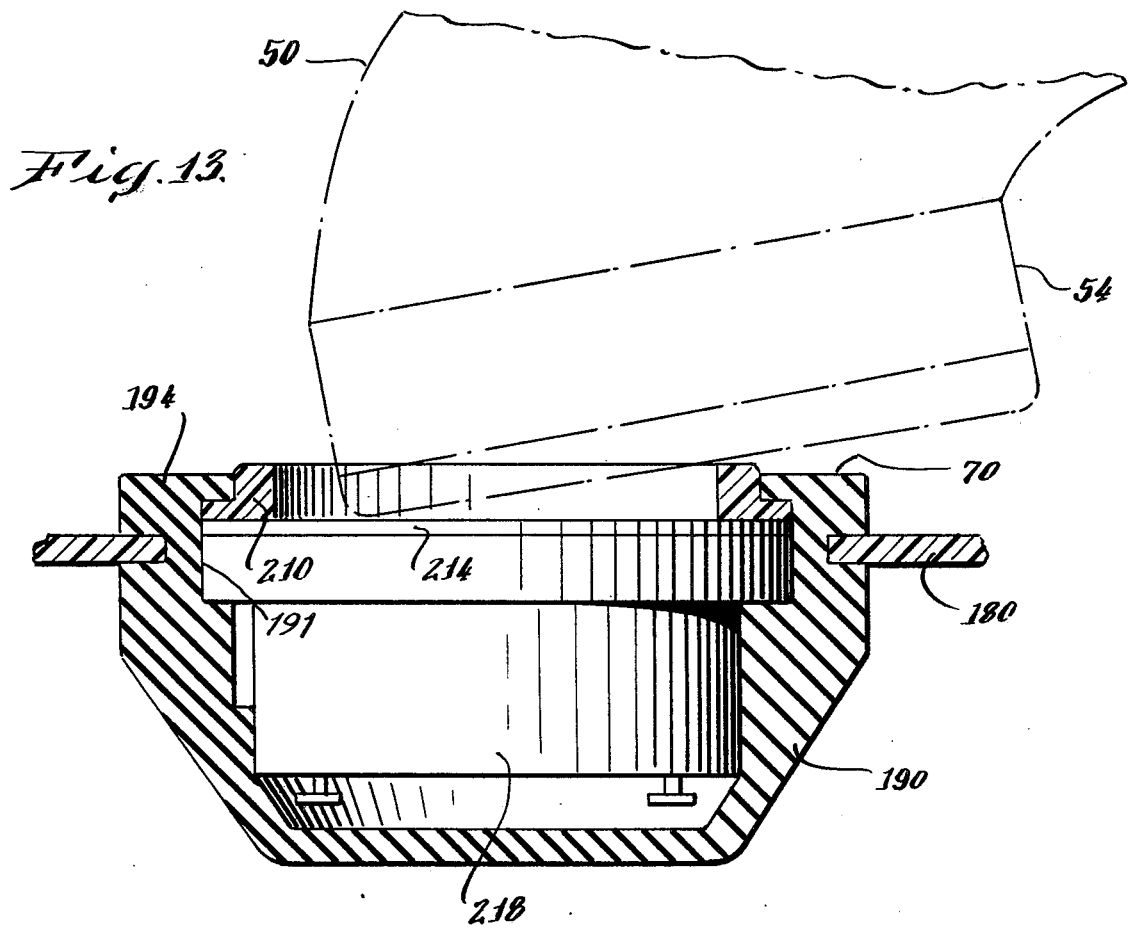

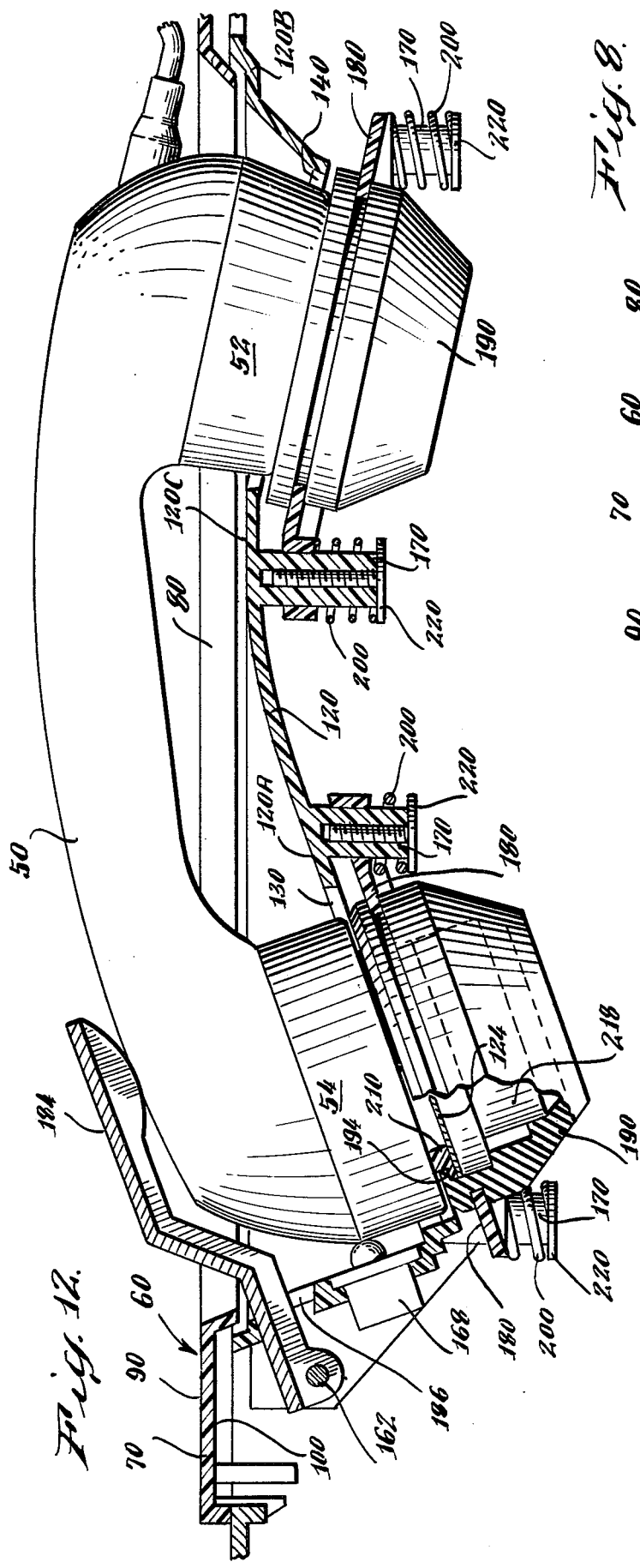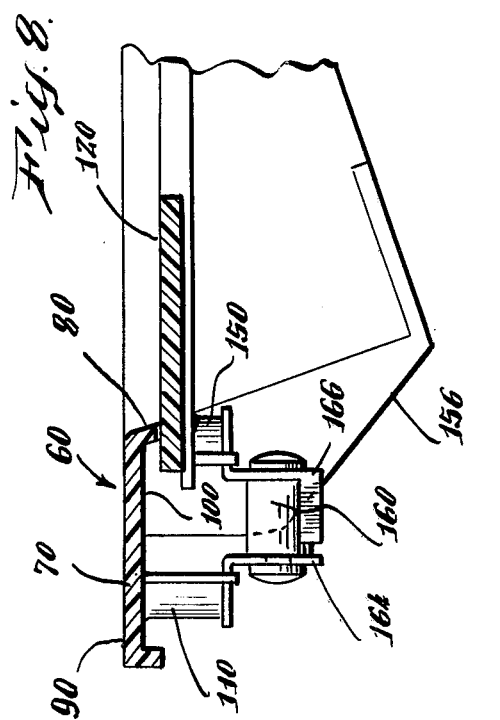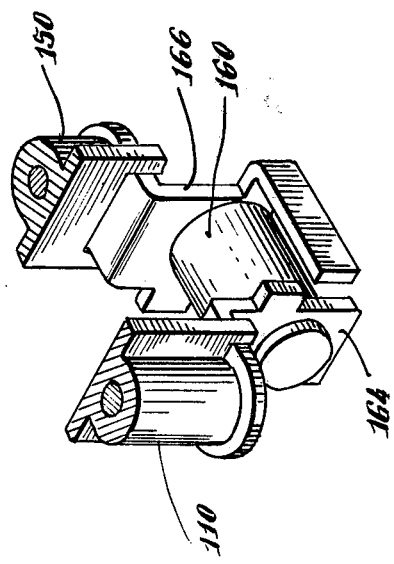

4,149,033

ACOUSTIC COUPLER ASSEMBLY

BACKGROUND OF THE INVENTION

In a facsimile machine, and the like, which uses a telephone handset to transmit and receive messages, the machine includes a cradle or handset support which usually comprises a ring of rubber which holds the telephone securely in place and prevents it from slipping. A pressure plate for the handset is also provided, and the handset is forced under this pressure plate and across the rubber support into its operating position. It has been found to be extremely difficult to force a telephone handset across a rubber support surface, and, in one machine, this problem is solved by not using a rubber ring but using, instead a large plastic disk which provides a large slippery surface. The handset slides comfortably on this disk; however, the favorable seal provided by the rubber ring is not present. In addition, in known facsimile apparatus, the support bed for the handset does not have optimum resiliency as provided by the present invention.

SUMMARY OF THE INVENTION

Briefly, the invention comprises the provision of a right of slippery material within a rubber ring, the slippery ring being contacted by the telephone handset as it is slipped into its operating position in a facsimile machine.

DESCRIPTION OF THE DRAWINGS

FIG. 1 is a plan view of a typical facsimile machine embodying the invention;

FIG. 2 is a top plan view of a portion of a telephone handset support assembly;

FIG. 3 is a bottom plan view of the apparatus of FIG. 2;

FIG. 4 is a top plan view of another portion of the telephone handset support assembly;

FIG. 5 is a side view of the apparatus of FIG. 4;

FIG. 6 is a bottom plan view of the apparatus of FIG. 4;

FIG. 7 is a view, along the line 7—7 in FIG. 4, that is, a left end view of the apparatus of FIG. 4;

FIG. 8 is a sectional elevational view of a portion of the apparatus of FIG. 2 and FIG. 4 showing the two parts assembled;

FIG. 9 is a perspective view of the apparatus for coupling together the apparatus shown in FIGS. 2 and 4;

FIG. 12 is a side elevational view, partly in section, showing the apparatus of the invention with a telephone handset in place; and FIG. 13 is a sectional elevational view of a portion of the handset receiving assembly illustrating one aspect of the invention.

DESCRIPTION OF THE PREFERRED EMBODIMENTS

Figure 10:
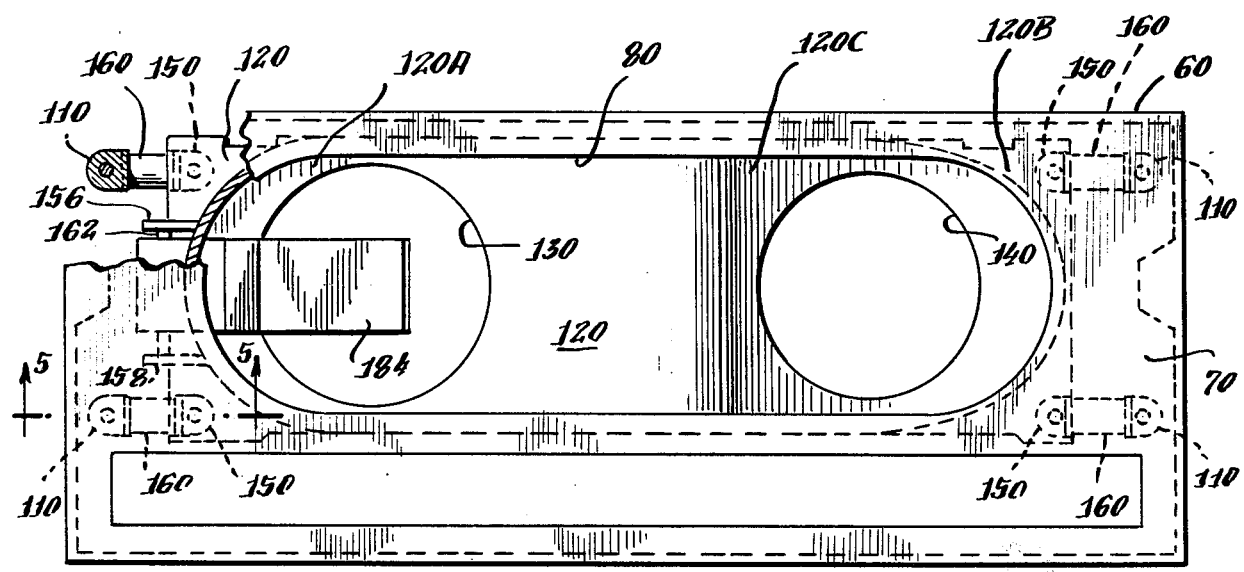
FIG. 10 is a top plan view, partly in section, showing the apparatus of FIGS. 2 and 4 assembled.
Figure 11:
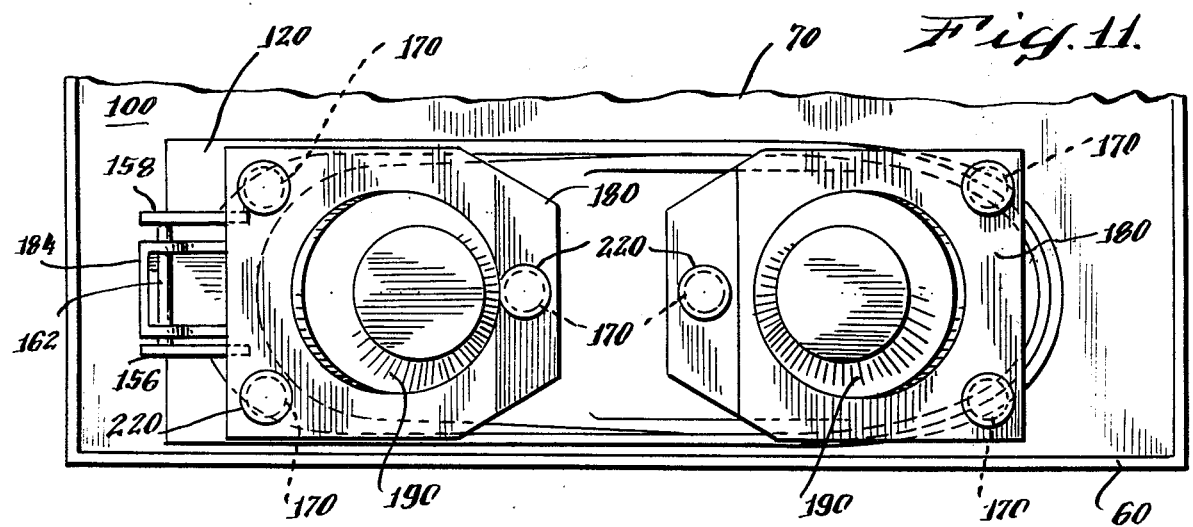
FIG. 11 is a bottom plan view showing the apparatus of FIGS. 2 and 4 assembled.

The present invention is useful with many types of apparatus; however, it is prarticularly suited for use with a facsimile machine 10, one form of which is shown schematically in FIG. 1. The facsimile machine 10 includes a housing or casing 20 which contains the usual electronic circuitry, a rotatable cylinder 30 which carries a document sheet, apparatus 40 for reading a printed document or writing electrically on a blank recording sheet, and a telephone 50 which transmits and receives electrical signals. The telephone 50 has the usual handset 51 which includes an earpiece or receiver 52 and mouthpiece or transmitter 54, and is suitably mounted on the housing 20.

The housing 20 for the machine 10 includes a support area 60, for example, on its top surface, which is readily accessible and includes a support assembly for receiving the telephone handset 50 when it is desired to operate the machine. This portion of the machine, that is, the telephone handset support assembly, includes a generally flat insulating plate 70 (FIGS. 2 and 3) having a generally oval opening 80, large enough to receive the telephone handset, and suitably secured to the frame of the machine. The plate 70 has a top surface 90 and a bottom surface 100, and, on its bottom surface, the plate is provided, at the four corners of the oval opening 80, with threaded mounting posts 110. The plate has one or more slots 82 for receiving electrical switches 84 or the like.

Another member 120 (FIGS. 4, 5, and 6), which actually supports the telephone handset, is secured to the lower surface of plate 70 in alignment with the oval opening 80 in plate 70. Member 120 is generally cylindrical in form, with an oval cross-section (like opening 80) and includes a top rim 121, a side wall 122, an open upper end, defined by rim 121, and a lower end closed by a base plate 124. The lower surface of the rim 121 is provided with threaded posts 150 at its corners, each post 150 (FIG. 6) being near a post 110. A flexible coupling (FIGS. 8 and 9) is provided between member 120 and plate 70, and this includes a rubber cylinder 160 secured between a first L-shaped bracket 164 secured to a post 110 on the plate 70 and between a second L-shaped bracket 166 secured to an adjacent post 150 of member 120. The base plate 124 supports the telephone handset and is not flat, but is generally V-shaped, with the apex of the "V" 124C being up and with the two portions 124A and 124B of the "V" sloping downwardly therefrom. The portions 124A and 124B are each provided with an aperture 130 and 140, respectively, over which the telephone transmitter and receiver lie when the telephone handset is in position thereon.

Member 120 also includes a pair of projecting walls 156 and 158 which extend away from the left hand end of the plate, as seen in FIGS. 5, 6, 7, and 12. A pin 162 is secured between the walls, and a pressure arm 184 is mounted on the pin 162 and projects through an opening 186 in the side wall of the plate and extends inwardly therefrom and overlies the opening 130. The pressure arm 184 has a certain amount of play, as permitted by the size of opening 186. However, its upward movement is limited. In addition, a switch 168 (FIG. 12) is mounted in this end wall of the member 120, positioned to be operated by the handset. The switch 168 is connected to the electrical circuitry of the machine which is thus energized or de-energized, depending on whether the handset is in place or not.

On the lower surface of plate 124 are also provided three threaded posts 170 spaced about each of the openings 130 and 140. Secured to these posts, in alignment with each opening 130 and 140, is an insulating plate 180. The plates 180 have apertures, by means of which they are threaded on posts 170, along with springs 200 and locking members 220, which are secured to the posts 170 to retain the plates 180 on the posts 170. The springs 200 provide a resilient mounting for the two plates 180. The springs associated with opening 130 are heavy springs, and the other springs are lighter springs. The plates 180 have generally central openings in which a rubber cylinder or insert 190 is seated. Each rubber insert includes a ring portion 194 which engages the plate 180 and surrounds the opening and which serves as a cushion on which the telephone handset can be securely seated when in use. The main body of each insert extends beneath its plate 180.

According to the invention, a ring 210 of material having a low coefficient of friction, a ring of plastic, for example, is secured to the portion 194 of the rubber insert 190 which lies beneath the pressure arm 184 so that, when the telephone 50 is moved into place, as illustrated in FIG. 13, it bears against and slides on the plastic ring 210. Once the telephone is in place, it is held in place by the rubber insert 190. The insert 190 may be provided with an annular notch 191 in which the ring 210 is secured, or the ring may be secured in place in any other suitable fashion.

It is noted that, when the handset is moved into place, the pressure arm 184 is lifted to its most elevated position at which it is held by the housing, and the flexibly mounted assembly beneath the handset gives sufficiently, against the insertion pressure of the handset, to permit the handset to seat on the member 120.

The usual flexible diaphragm 214 is provided beneath the ring 210, and the required transducer assembly 218 is provided within each of the rubber inserts 190.

What is claimed is:

1. An acoustic coupler for an information transmitting machine comprising
    a housing,
    an aperture in said housing for receiving a telephone handset including a transmitter and a receiver,
    support means in said aperture including flexible mountings which render said support means and said entire handset including the transmitter and receiver somewhat movable with respect to said housing when a telephone handset is mounted thereon, and
    a pressure arm pivotally mounted on said housing and overlying a portion of said aperture, said pressure arm being limited in its movement away from said aperture whereby, when a telephone handset is brought into engagement with said support means for mounting thereon, it bears against said pressure arm, which is disposed at its maximum elevation with respect to said support means, and the flexible mounting of said support means permits said handset to be set in place thereon beneath and in contact with said pressure arm.

2. The apparatus defined in claim 1 wherein said support means comprises
    a first plate having top and bottom surfaces and secured to said housing and having an aperture for receiving a telephone handset,
    a second generally cylindrical member secured through flexible couplings to the bottom surface of said first plate, said second member having base portion which is adapted to support a telephone handset and has openings for receiving the transmitter and receiver of the handset, said base portion having a top surface and a bottom surface, and
    a pair of plates secured through flexible couplings to the lower surface of said base portion, each plate of the pair being aligned with one of said openings, each plate of the pair carrying electronic telephone circuitry.

3. The apparatus defined in claim 1 wherein said support means comprises
    a first plate having top and bottom surfaces and secured to said housing and having an aperture for receiving a telephone handset,
    a second generally cylindrical member secured through flexible couplings to the bottom surface of said first plate, said second member having a base portion which is adapted to support a telephone handset and has openings for receiving the transmitter and receiver of the handset, said base portion having a top surface and a bottom surface, and
    a pair of plates secured through flexible couplings to the lower surface of said base portion, each plate of the pair being aligned with one of said openings, each plate of the pair carrying electronic telephone circuitry and rubber-like support means on which a telephone handset rests.

4. An acoustic coupler for a facsimile machine comprising
    a first member comprising an insulating plate having a top surface and a bottom surface,
    a second member comprising a support for a telephone handset including a transmitter and receiver, said second member being flexibly coupled to said first member, said second member having a generally planar upper portion positioned adjacent to said first member and a generally oval-shaped cylindrical portion which receives said handset and has a base which supports said handset, said base having an upper surface and a lower surface, said base having first and second apertures for receiving the transmitter and receiver of the handset,
    a first apertured insulating plate flexibly coupled to the lower surface of said base with its aperture aligned with said first aperture,
    a second apertured insulating plate flexibly coupled to the lower surface of said base with its aperture aligned with said second aperture,
    a first rubber insert in said first aperture,
    a second rubber insert in said second aperture, and
    a ring of material having a low coefficient of friction secured to said first insert and positioned so that said handset slides thereon as it is positioned on said acoustic coupler,
    said ring have a smaller diameter than said first insert so that said handset slides into place on said ring but once in position, it seats on and engages said rubber-like support.

5. A support assembly for a telephone handset comprising
    a first member comprising a thin insulating plate having a top surface and a bottom surface, said plate having a generally oval-shaped aperture into which a telephone handset can be inserted,
    a plurality of first mounting posts on said bottom surface of said first member adjacent to said oval-shaped aperture,
    a second member including a generally planar upper rim and a depending oval-shaped cylindrical portion having a base, said base having first and second apertures, flexible mounting means coupling said rim to said first mounting posts, said base having a top surface and a bottom surface, a plurality of second mounting posts on said bottom surface of said base adjacent to each of said first and second apertures, a first apertured insulating diaphragm-carrying plate flexibly coupled to selected ones of said second mounting posts with its aperture aligned with said first aperture in said base, a second apertured insulating diaphragm-carrying plate flexibly coupled to others of said second mounting posts with its aperture aligned with said second aperture in said base, a first rubber insert in said first aperture, a second rubber insert in said second aperture, and a ring of material having a low coefficient of friction secured to said first insert and positioned so that said handset slides thereon as it is positioned on said acoustic coupler, said ring having a smaller diameter than said first insert so that said handset slides into place on said ring but once in position, it seats on and engages said rubber-like support.

6. An acoustic coupler for an electronic information converting and transmitting machine comprising a housing, a horizontal support, for a telephone handset, spring-mounted on said housing whereby said entire support and the handset are resiliently mounted with respect to the housing, a pressure arm secured to said housing adjacent to said support, first and second generally annular rubber supports on said housing for receiving and supporting the mouthpiece and receiver of the telephone handset, and a ring of hard-surfaced, slippery material disposed within said first annular rubber member, said ring having a smaller diameter than said first annular rubber member so that said handset slides into place on said ring but, once in position, it seats on and engages said first and second rubber supports.

7. An acoustic coupler for an electronic informaion converting and transmitting machine comprising a housing, a horizontal support for a telephone handset spring-mounted on said housing whereby said entire support and the handset are resiliently mounted with respect to the housing, first and second generally annular rubber supports on said housing for receiving and supporting the mouthpiece and receiver of the telephone handset, a pressure arm secured to said housing adjacent to said support and overlying said first rubber support, and a ring of hard-surfaced, slippery material disposed within said first annular rubber member, said ring having a smaller diameter than said first annular rubber member so that, when said handset is inserted under said pressure arm, it slides into place on said ring but, once in position, it seats on and engages said first and second rubber supports.

8. An acoustic coupler for an information transmitting machine comprising a housing, an aperture in said housing for receiving a telephone handset including a transmitter and a receiver, support means in said aperture including flexible mountings which render said support means somewhat movable with respect to said housing when a telephone handset is mounted thereon, said support means comprising a first plate having top and bottom surfaces and secured to said housing and having an aperture for receiving a telephone handset, a second generally cylindrical member secured through flexible couplings to the bottom surface of said first plate, said second member having a base portion which is adapted to support a telephone handset and has openings for receiving the transmitter and receiver of the handset, said base portion having a top surface and a bottom surface, and a pair of plates secured through flexible couplings to the lower surface of said base portion, each plate being aligned with one of said openings, each plate carrying electronic telephone circuitry and rubber-like support means on which a telephone handset rests, a pressure arm pivotally mounted on said housing and overlying a portion of said aperture, said pressure arm being limited in its movement away from said aperture whereby, when a telephone handset is brought into engagement with said support means for mounting thereon, it bears against said pressure arm, which is disposed at its maximum elevation with respect to said support means, and the flexible mounting of said support means permits said handset to be set in place thereon beneath and in contact with said pressure arm, said rubber-like support presenting two generally annular surfaces, one for receiving and supporting the transmitter of a telephone handset and one for receiving and supporting the receiver of a telephone handset, and a ring of material having a low coefficient of friction, said ring being carried by one of the annular surfaces of said rubber-like support and adapted to be contacted by said handset when the handset is moved into position on said support means, said ring providing a slippery surface on which said handset slides as it moves into place on said support means, said ring having a smaller diameter than said one of said annular surfaces so that said handset slides into place on said ring but once in position, it seats on and engages said rubber-like support.

* * * * *